United States Patent
Medlock et al.

(10) Patent No.: US 7,031,376 B2
(45) Date of Patent: Apr. 18, 2006

(54) FAST INITIAL ACQUISITION AND SEARCH DEVICE FOR A SPREAD SPECTRUM COMMUNICATION SYSTEM

(75) Inventors: Joel D. Medlock, Los Gatos, CA (US); Uma Jha, Placentia, CA (US)

(73) Assignee: Infineon Technologies AG, Munich (DE)

( * ) Notice: Subject to any disclaimer, the term of this patent is extended or adjusted under 35 U.S.C. 154(b) by 808 days.

(21) Appl. No.: 09/751,777

(22) Filed: Dec. 29, 2000

(65) Prior Publication Data

US 2001/0048713 A1 Dec. 6, 2001

Related U.S. Application Data

(60) Provisional application No. 60/173,629, filed on Dec. 30, 1999.

(51) Int. Cl.
*H04B 1/707* (2006.01)

(52) U.S. Cl. .................. 375/150; 375/142; 375/343

(58) Field of Classification Search ............. 375/142, 375/143, 150, 152, 343
See application file for complete search history.

(56) References Cited

U.S. PATENT DOCUMENTS

| | | | |
|---|---|---|---|
| 5,414,729 A * | 5/1995 | Fenton .................. 375/149 |
| 5,490,165 A | 2/1996 | Blakeney, II et al. |
| 5,577,025 A | 11/1996 | Skinner et al. |
| 5,691,974 A | 11/1997 | Zehavi et al. |
| 5,703,873 A | 12/1997 | Ojanpera et al. |
| 5,710,768 A | 1/1998 | Ziv et al. |
| 5,781,543 A | 7/1998 | Ault et al. |
| 5,920,549 A | 7/1999 | Bruckert et al. |
| 5,950,131 A | 9/1999 | Vilmur |
| 6,128,331 A * | 10/2000 | Struhsaker et al. .......... 375/142 |
| 6,272,430 B1 * | 8/2001 | Krasner ...................... 701/207 |
| 6,307,878 B1 * | 10/2001 | Sokolov et al. ............ 375/150 |
| 6,393,046 B1 * | 5/2002 | Kohli et al. ................ 375/134 |
| 6,549,565 B1 * | 4/2003 | Buehrer et al. ............ 375/142 |
| 6,590,872 B1 * | 7/2003 | Shiue et al. ................ 370/314 |

OTHER PUBLICATIONS

Zhuang, Weihua, "An Improved Hybrid PN Code Acquisition for CDMA Personal Wireless Communications", Sep. 1995, IEEE Personal, Indoor and Mobile Radio Communications, 995-99.*

* cited by examiner

*Primary Examiner*—Jay K. Patel
*Assistant Examiner*—David B. Lugo
(74) *Attorney, Agent, or Firm*—Darby & Darby

(57) ABSTRACT

A fast initial acquisition and search device for a spread spectrum communication system is disclosed herein. The search device includes a memory for storing the first code sequence, and a plurality of computation circuits coupled in parallel to the memory. The search device also includes a plurality of threshold detector circuits. Each of the plurality of threshold detector circuits is respectively coupled to one of the plurality of computation circuits. Each of the plurality of computation circuits implements a unique phase offset for a second code sequence with respect to the first code sequence. A correlation operation is performed in parallel at each of the plurality of computation circuits followed by a threshold evaluation that indicates whether the correlation result satisfied a threshold value.

10 Claims, 6 Drawing Sheets

FAST INITIAL ACQUISITION AND SEARCH DEVICE FOR A SPREAD SPECTRUM COMMUNICATION SYSTEM

CROSS-REFERENCE TO RELATED APPLICATION

This application claims priority to the provisional patent application with the following Ser. No. 60/173,629, filed on Dec. 30, 1999.

Related application, which are incorporated herein by reference, are:

A CONFIGURABLE ALL-DIGITAL COHERENT DEMODULATOR SYSTEM FOR SPREAD SPECTRUM APPLICATIONS

Ser. No. 09/751,783

A CONFIGURABLE MULTIMODE DESPREADER FOR SPREAD SPECTRUM APPLICATIONS

Ser. No. 09/571,785

APPARATUS AND METHOD FOR CALCULATING AND IMPLEMENTING A FIBONACCI MASK FOR A CODE GENERATOR

Ser. No. 09/751,776

A CONFIGURABLE CODE GENERATOR SYSTEM FOR SPREAD SPECTRUM APPLICATIONS

Ser. No. 09/751,782, now U.S. Pat. No.6,567,017

METHOD AND APPARATUS TO SUPPORT MULTI STANDARD, MULTI SERVICE BASE-STATIONS FOR WIRELESS VOICE AND DATA NETWORKS

Ser. No. 09/752,050

IMPROVED APPARATUS AND METHOD FOR MULTI-THREADED SIGNAL PROCESSING

Ser. No. 09/492,634 filed on Jan. 27, 2000

Except for application Ser. No. 09/492,634, all of the above application are filed simultaneously herewith.

TECHNICAL FIELD

The present claimed invention relates to the field of wireless communication. In particular, the present claimed invention relates to an apparatus and a method for locating a pilot signal for a wireless communication system.

BACKGROUND ART

Wireless communication has extensive applications in consumer and business markets. Among the many communication applications/systems are: fixed wireless, unlicensed (FCC) wireless, local area network (LAN), cordless telephony, personal base station, telemetry, mobile wireless, and other digital data processing applications. While each of these applications utilizes spread spectrum communications, most utilize unique a pilot signal in the communication protocol. However, the code space for the pilot signal can vary significantly depending upon the communication protocol specifying the pilot signal. Consequently, each application may utilize unique hardware, software, and methodologies for searching for the pilot signal. This practice can be costly in terms of design, testing, manufacturing, and infrastructure resources. As a result, a need arises to overcome the limitations associated with the varied hardware, software, and methodology of searching for pilot signals in each of the varied wireless applications.

Wireless devices that communicate to each other can be classified as either a base station or a handset, wherein a base station is usually fixed and acts as a hub to communicate with multiple handsets, which are sometimes mobile. Depending upon the application, the base station, the handset, or both, transmit a pilot signal. A searcher is utilized to find strong pilot signals of nearby base stations surrounding a given mobile handset. In a spread spectrum system, base stations as well as some handsets, transmit a standardized pilot signal having a known sequence of binary digits to aid in communication of data signals. These pilot signals can have a wide variety of codes, as determined by a specific communication protocol.

For example, in one protocol a pilot signal has a length of $2^{15}$ (32,768) bits (or chips). This known sequence is referred to as a short pseudonoise (PN) sequence for the Industry Standard-95 (IS-95) protocol version of the CDMA system. Because all the base stations configured for this protocol transmit the same PN signal over the same bandwidth, they distinguish themselves by transmitting the PN signal with a unique offset, or phase, relative to each other. For IS-95, the phase offset for base stations is 512 chips, or code bits. Given the noise-like quality of the PN sequences, only by replicating the phase of the known PN sequence precisely, e.g., within about 1 chip, will a communication device detect the pilot signal, thereby indicating the existence of a nearby base station. Thus a need arises to accurately determine the phase of the pilot signal for a communication device, such as a base station.

Because of the width of the code space and the lack of initial synchronization between two communication devices, the specific phase offset of a pilot signal can be anywhere within the code space. That is, when a handset is first turned on, there is no synchronization between the handset and a base station. For example, a pilot sequence can have a phase offset anywhere within the pilot code space.

Unfortunately, if the offset between a base station and a handset is near the end of a long chip sequence, then it could consume significant iterations in a searcher to finally identify the precise phase offset. Although the cycle time of a cellular device is very short, the large number of iterations required can consume a relatively significant amount of time. When an operator powers up a communication device, the few seconds required for searching and acquiring a pilot signal can be significant in some applications. Again, as user sophistication increases, demand for improved performance also increases. Consequently, a need arises for a method to overcome the speed limitations of a conventional search for finding a pilot signal phase offset.

SUMMARY OF THE INVENTION

The present invention provides a solution to the limitations associated with the varied hardware, software, and methodology of searching for pilot signals in each of the varied wireless applications. In particular, the present invention accurately determines the unknown phase of a pilot channel from a communication device, e.g., a base station. The present invention performs this task while overcoming the speed limitations of a conventional search.

One embodiment of the present invention provides a fast initial acquisition and search device for a spread spectrum communication system. The search device includes a memory for storing a first code sequence, and a plurality of computation circuits coupled to the memory in parallel. Each of the plurality of computation circuits implements a second code sequence at a unique phase offset from the first sequence. The search device also includes a plurality of threshold detector circuits. Each of the plurality of threshold detector circuits is coupled to a respective one of the plurality of computation circuits. The search device is operable to perform a correlation operation between the first code sequence and the second code sequence in parallel using the plurality of computation circuits. The results of the correlation operation are evaluated at a threshold detector, which provides a signal to subsequent devices if the threshold is satisfied.

A second embodiment of the present invention provides a method of searching for the phase offset of a signal. The method includes several steps, the first of which is receiving the signal, having a first code sequence, in a memory. Next, a second code sequence is received at a plurality of computation circuits. The plurality of computation circuits implement a unique phase offset for the second code sequence in each of the plurality of computation circuits. In the next step, the second code sequences, having unique phase offsets, are correlated in parallel to the first code sequence in a respective one of the plurality of computation circuits. Lastly, the correlation results from each of the plurality of computation circuits are compared to a threshold value at a respective one of a plurality of threshold detectors. If one of the threshold values is satisfied, a signal is transmitted indicating the result. Otherwise, no signal is transmitted from a threshold detector.

These and other objects and advantages of the present invention will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate embodiments of the invention and, together with the description, serve to explain the principles of the invention. It should be understood that the drawings referred to in this description are not drawn to scale unless specifically noted as such.

DETAILED DESCRIPTION OF THE INVENTION

Reference will now be made in detail to the preferred embodiments of the invention. Examples of the preferred embodiment are illustrated in the accompanying drawings. While the invention will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

The present invention can be implemented in a wide variety of digital spread-spectrum wireless communication systems or techniques. These systems or techniques include, but are not limited to, fixed wireless, unlicensed Federal Communications Commission (FCC) wireless systems, wireless local area network (W-LAN), cordless telephony, cellular telephony, personal base station, telemetry, and other digital data processing applications. The present invention can be applied to both transmitters, e.g., a base station or a handset, and to receivers, e.g., a terminal, for fixed wireless, W-LAN, cellular telephony, and personal base station applications.

In particular, one fixed wireless application to which the present invention may be applied is a metropolitan multipoint distribution system (MMDS). Examples include wireless cable broadcast, or two-way wireless local loop (WLL) systems. Some examples of a W-LAN, that can communicates digitized audio and data packets, for which the present invention can be applied include Open Air, and the Institute of Electrical and Electronics Engineers (IEEE) specification 802.11 b. And in the application of unlicensed FCC applications, the present invention may be applied to specific instances such as the Industrial, Scientific, and Medical band (ISM) devices, which can include cordless telephony products. Personal base stations can utilize either cordless or cellular telephony wireless communication standards. Lastly, the cellular telephony systems in which the present invention can be applied includes, but is not limited to, IS-95, IS2000, ARIB, 3GPP-FDD, 3GPP-TDD, 3GPP2, 1EXTREME, or other user-defined protocols. The range of pilot signal techniques that are utilized in the exemplary spread spectrum applications disclosed herein, are useful to define the class of functions for which the present fast searcher is applicable.

Figure 1:
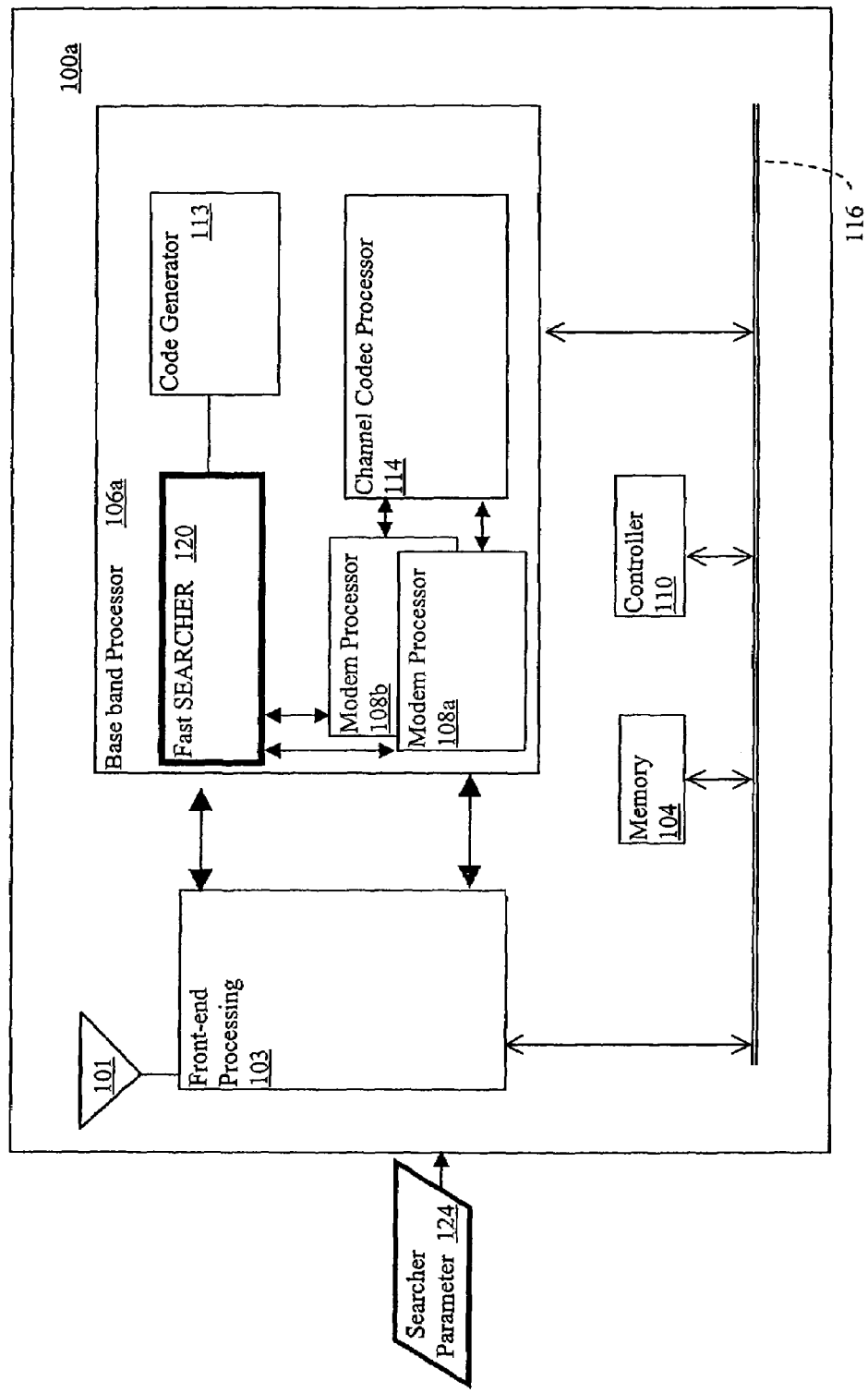
FIG. 1 is a block diagram of a spread spectrum communication device having a fast searcher, in accordance with one embodiment of the present invention.

The detailed description of the present invention begins with a description of a communication device, in FIG. 1 in which a fast searcher is utilized. Then, the detailed description section will continue with details of the physical structure and architecture of the components of the fast searcher, in FIGS. 2A–3. Lastly, the detailed description section will describe, in FIG. 4, a processes associated with the fast searcher using an exemplary flowchart.

Referring now to FIG. 1, a block diagram of a spread spectrum communication device having a fast searcher is shown, in accordance with one embodiment of the present invention. Electronic communication device 100a is a wireless base station in the present embodiment. However, the present invention is well suited to application in a mobile handset, an embedded wireless modem, a test platform, or other communication device. Additionally, the present invention is applicable to any electronic device needing to identify a phase offset of a signal with a known data sequence, e.g., a pilot signal. Communication device 100a is operable as described in a subsequent flowchart.

Communication device 100a includes an antennae 101 coupled to a front-end processing block 103 to receive a wireless signal. Front-end processing block 103 includes components (not shown) such as a radio frequency (RF) transceiver and an analog to digital (A/D) converter, coupled to each other in series. The subcomponents and functions of these components within front-end processing block 103 are known to those skilled in the art. Front-end processing block 103 is coupled to a base band processor 106a and a bus 116, to which a memory 104 and a processor (or controller) 110 are also coupled. A searcher parameter input 124 is provided to communication device 100a.

Base band processor 106a, which is operable to process the base band portion of the received signal, includes components such as a modem processors 108a and 108b, coupled to a channel codec processor 114 and to a fast searcher 120. Base band processor 106a also includes a code generator 113 coupled to the fast searcher in one embodiment. It is appreciated that modem processors 108a and 108b, codec processor 114, and code generator 113 have components that are known to those skilled in the art.

Figure 2A:
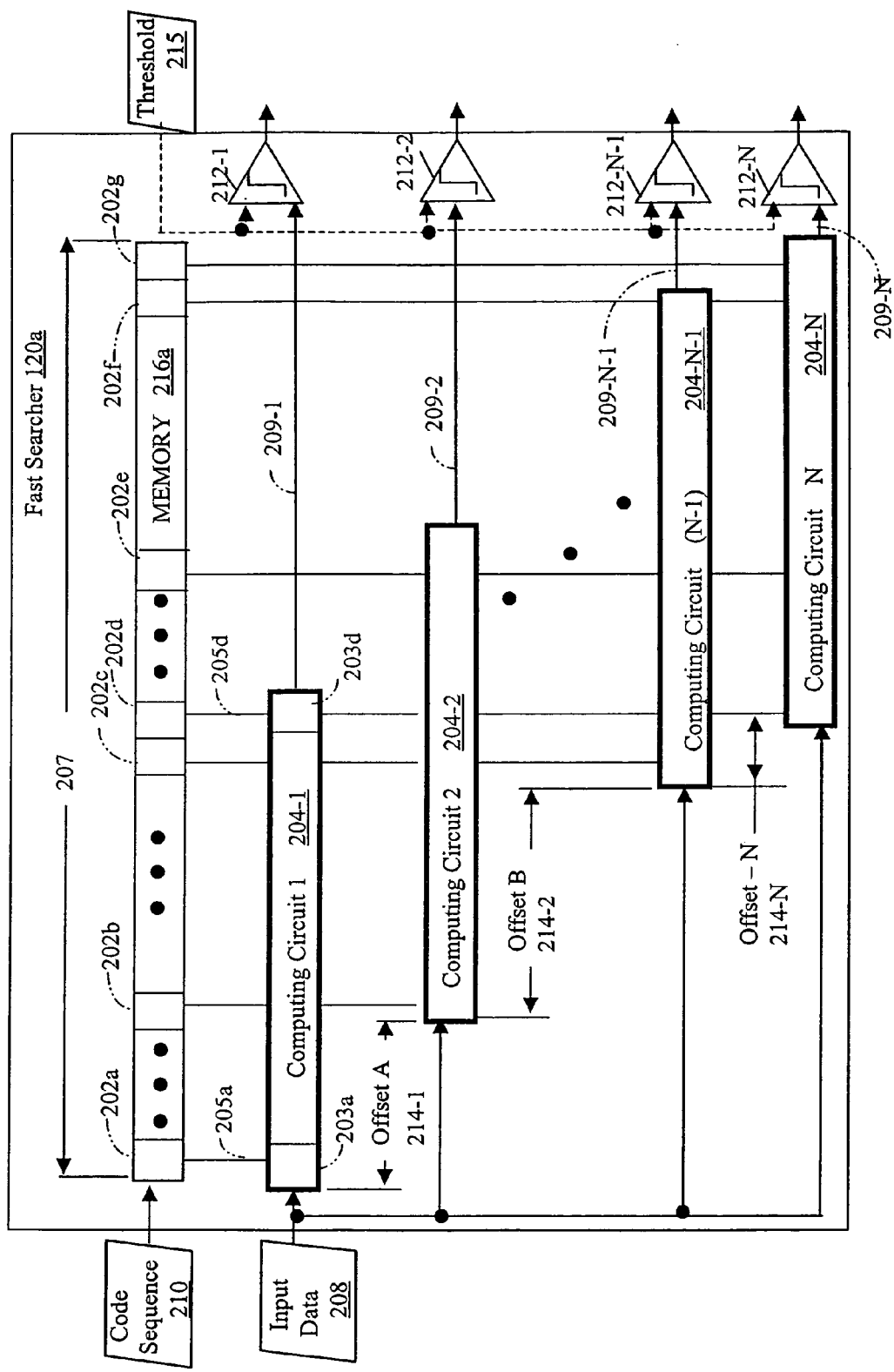
FIG. 2A is a block diagram of a fast searcher having multiple computation circuits whose coupling arrangement is offset from each other, in accordance with one embodiment of the present invention.
Figure 2B:
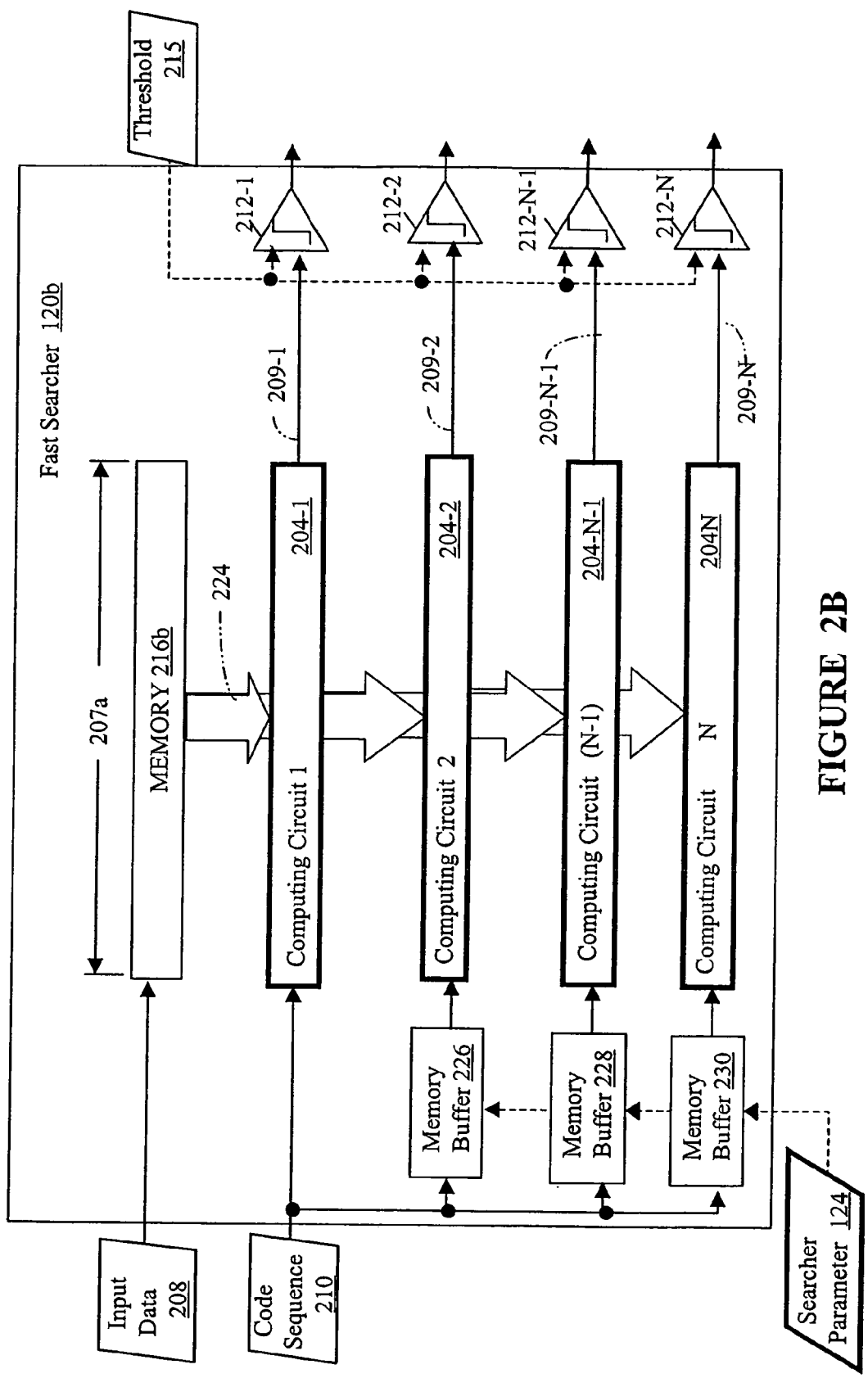
FIG. 2B is a block diagram of a fast searcher having multiple computation circuits with memory buffers, in accordance with one embodiment of the present invention.
Figure 2C:
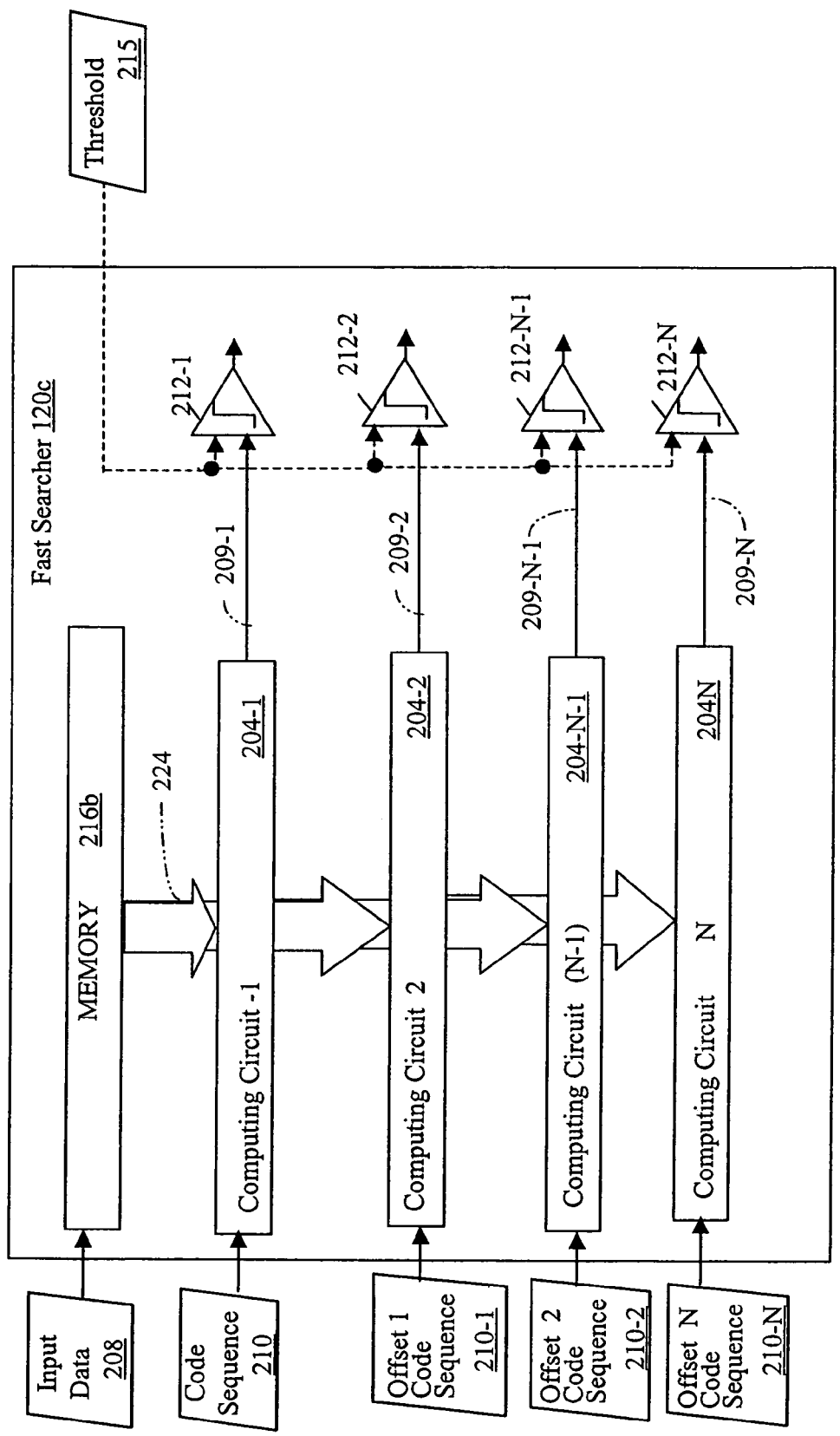
FIG. 2C is a block diagram of a fast searcher having multiple computation circuits that are aligned with each other, in accordance with one embodiment of the present invention.

Fast searcher 120 is a device that provides parallel searches in the present embodiment. Subsequent FIGS. 2A through 2C provide exemplary embodiments, e.g., searcher 120a–120c, of fast searcher 120 in FIG. 1. By performing parallel searches for a pilot code, fast searcher 120 is able to improve overall performance of communication device 100a.

While communication device 100a provides a specific quantity of components that are arranged in a specific configuration, the present invention is well suited to a wide range of alternatives. For example, a single modem processor is used in one embodiment, while another embodiment utilizes greater than two modem processors, coupled to fast searcher 120. Furthermore, communication device 100a is adaptable to a wireless system utilizing code division multiple access (CDMA) protocol in one embodiment. However, communication device 100a is well suited to other spread spectrum communication protocols.

Referring now to FIG. 2A a block diagram of a fast searcher having multiple computation circuits that are offset from each other is shown, in accordance with one embodiment of the present invention. Fast searcher 120a is operable in the present embodiment to parallely search for a phase offset between a first and second signal. The operation of fast searcher 120a is described in more detail in a subsequent flowchart.

Fast searcher 120a includes a memory block 216a coupled in parallel to multiple computation circuits 204-1 through 204-N. Each of the multiple computation circuits, e.g., 204-1 through 204-N, have an offset coupling arrangement with memory block 216a. For example, computation circuit 204-2 has a coupling arrangement to memory 216a that is offset from the coupling arrangement of computation circuit 204-1 by an offset A 214-1. Similarly, computation circuit N-1 204-N-1 is offset from computation circuit 204-2 by an offset B 214-2; and computation circuit N 204-N is offset from computation circuit 204-N-1 by offset N 214-N. Offsets 214-1 through 214-N, between computation circuits 204-1 through 204-N, enable parallel correlation with unique phase offsets between an internally generated code sequence 210, input to and stored in memory block 216a, and a code sequence of a received input signal 208, input to and stored in each of computation circuits. Thus, a relative offset in the code sequence between each of the computing circuits 204-1 through 204-N is accomplished. In one embodiment, offsets between computation circuits are 512 chips for an IS-95 protocol separating base station pilot signals by a phase offset of 512 chips. Code sequence 210 is provided by code generator 113 of FIG. 1 in the present embodiment. However, code sequence can be stored in, and provided by, a memory block in another embodiment. In contrast, input signal 208 is provided via antennae 101 and front-end processing block 103 of FIG. 1.

In the present embodiment, each of computation circuits 204-1 through 204-N include a same quantity of multiple bit slices, e.g., 203a through 203d. Bit slices of computation circuits 204-1 through 204-N include components for performing correlate, integrate and dump operations, and energy computation operations. An exemplary configuration of these components is described in subsequent FIG. 3. The length of a computation circuit represents a window width of correlation between a code sequence stored in a computation circuit, e.g., 204-1, and a code sequence stored in memory block 216a. For example, even though a pilot PN code sequence may be 32,000 chips long, a thirty-chip window may provide sufficient results for a fast searcher device in one embodiment. The present invention is well suited to using any length of computation circuits 204-1 through 204-N and memory block 216a.

Memory block 216a, which is a first in first out (FIFO) configuration, has a quantity of individual memories, e.g., 202a–202g, that yield a memory block of size 207 in the present embodiment. Individual memories 202a–202g can be any type of memory device capable of storing a state, e.g., flip-flop registers, flash random access memory (RAM), etc. Size 207 is determined by summing the quantity of the multiple bit slices in one of the computation circuits, e.g., 204-1, plus the sum of the offsets for all the computation circuits, e.g., offsets 214-1 through 214-N. This relationship enables sufficient memory resources in memory 216a to provide a code sequence stored in memory 216a to the applicable one of multiple computation circuits 204-1 through 204-N. Each bit slice, e.g., 203a and 203d, in a computation circuit, e.g., 204-1, is coupled to a specific memory, e.g., 202a and 202d respectively, in the memory block-216a, for the present embodiment. Similarly memories 202b–202e are coupled to computing circuit 204-2, while memories 202c–202f are coupled to computing circuit (N-1) 204-N-1, and memories 202d–202g are coupled to computing circuit N 204-N.

Each of the multiple computation circuits 204-1 through 204-N are respectively coupled to one of multiple threshold detector circuits 212-1 through 212-N, via line 209-1 through 209-N, respectively. Each of threshold detector circuits 212-1 through 212-N have an input coupled to receive a threshold input value 215, which can be stored in a memory within searcher, or a memory portion 104 of communication device 100a. Threshold detector 214-1 is any device that can compare two signals and provide an output when one input meets and/or exceeds the other. A digital comparator circuit is used as a threshold detector in the present embodiment.

While a specific configuration of fast searcher 120a is provided, the present invention is well suited to a wide variety of alternative embodiments, several of which are discussed herein. For example, an alternative embodiment can utilize a different quantity of bit slices for the computation circuit, or a different quantity of computation circuits. For example, computation circuits can have just a single bit slice to perform a single correlation operation at a time. The results could be accumulated over a period of cycles, e.g., 30 cycles, to provide an equivalent result of a single thirty-bit wide computation circuit operating over a single cycle. In another embodiment, the number of bit slices can vary from one computation circuit to another. In this latter embodiment, a threshold input value provided to the threshold detectors for each of the computation circuits can have a different threshold level, proportional to the number of bit slices in the computation circuit.

Similarly, size 207 of memory block 216a can also vary over a wide range of values, providing it has enough individual memory resources to communicate a code sequence to each of the computation circuits. In another alternative embodiment, only a single threshold detector is utilized to detect the results of all the computation circuits at once. Individual computation circuits can then be checked individually, via multiplexed coupling to a threshold detector. Additionally, the quantity of computation circuits, their length, and the threshold values can all vary over a wide range of values, as appropriate for a given application. And the inputs can be interchanged, e.g., code sequence 210 can be provided to the multiple computation circuits 204-1 through 204-N, and input signal 208 can be provided to memory block 216a.

It is appreciated that fast searcher 120a in FIG. 2A has components that accommodate only real signals, e.g., 208 and 210, for purposes of clarity. In this present embodiment, only one memory block 216a and only one set of threshold detector circuits, e.g., 212-1 through 212-N, are needed. Additionally, computing circuits 204-1 through 204-N only have correlate and integrate and dump circuitry for a real signal, as described hereinafter in FIG. 3. In another embodiment, fast searcher 120a has components and coupling arrangements that accommodate complex signals, e.g., complex code sequence 210 and/or complex input signal 208. In this latter embodiment, fast searcher 120a would utilize some duplicate elements, such as a memory block for storing a both an in-phase and a quadrature-phase portion of the input data signal 208. In this embodiment, complex values for each memory would be coupled to the multiple computation circuits 204-1 through 204-N. For complex signals, a duplicate set of threshold detectors would also be utilized to detect the quadrature portion of the correlated signals.

Referring now to FIG. 2B, a block diagram of a fast searcher having multiple computation circuits with memory buffers is shown, in accordance with one embodiment of the present invention. FIG. 2B provides an alternative fast searcher to that described in FIG. 2A. Fast searcher 120b has many components and coupling arrangements that are similar to those presented in fast searcher 120a of FIG. 2A. For purposes of clarity, only a description of subcomponents, coupling arrangements, and alternatives for FIG. 2B that are different from FIG. 2A will be provided.

Fast searcher 120b includes new components such as memory buffers 226–230, as compared to FIG. 2A. Memory buffers 226–230 are coupled to computation circuits 204-2 through 204-N respectively, and coupled to receive an input code sequence 210. Memory buffers 226–230 can each have a unique quantity of individual memories, indicative of a unique code offset in the code sequence 210 provided to each of multiple correlator circuits 204-1–204-N. Memory buffers 226–230 can have a uniform or non-uniform amount of code offset from each other. The amount of code offset can either be statically set in one embodiment or variably set in another embodiment via a searcher parameter input 124.

Multiple computation circuits 204-1 through 204-N are coupled to memory block 216b via a common bus 224 without any relative offset to each other. That is, respective portions of computation circuits 204-1 through 204-N are coupled to the same memory location in memory 216b, e.g., the starting location of computation circuits 204-1 through 204-N are coupled to the same location in memory block 216b. In this manner, coupling of computation circuits 204-2 to memory block 216b in FIG. 2B is simpler than that provided in FIG. 2A. While memory block 216b has a shorter size 207a, with respect to FIG. 2A, additional memory buffers 226–230 essentially offset the difference.

Referring now to FIG. 2C, a block diagram of a fast searcher having multiple computation circuits that are aligned with each other is shown, in accordance with one embodiment of the present invention. For purposes of clarity, only a description of subcomponents, coupling arrangements, and alternatives for FIG. 2C that are different from FIGS. 2A and 2B will be provided.

Fast searcher 120c of FIG. 2C provides a separate input for each of the multiple computation circuits 204-1 through 204-N. In particular, code sequence 210 and offset 1 code sequence 210-1 through offset code sequence N 210-N, which are provided to computation circuits 204-1 through 204-N respectively, already have a unique code offset with respect to each other. Thus, no memory buffer is required for coupling input signals to computation circuits, as shown in FIG. 213, nor is a long memory block 216a of FIG. 2A.

In one embodiment, offset code sequence inputs 210-1 through 210-N are provided by a code generator, e.g., code generator 113 of FIG. 1. The CGU application described in FIG. 1 provides one embodiment of a device that is capable of providing these inputs.

Figure 3:
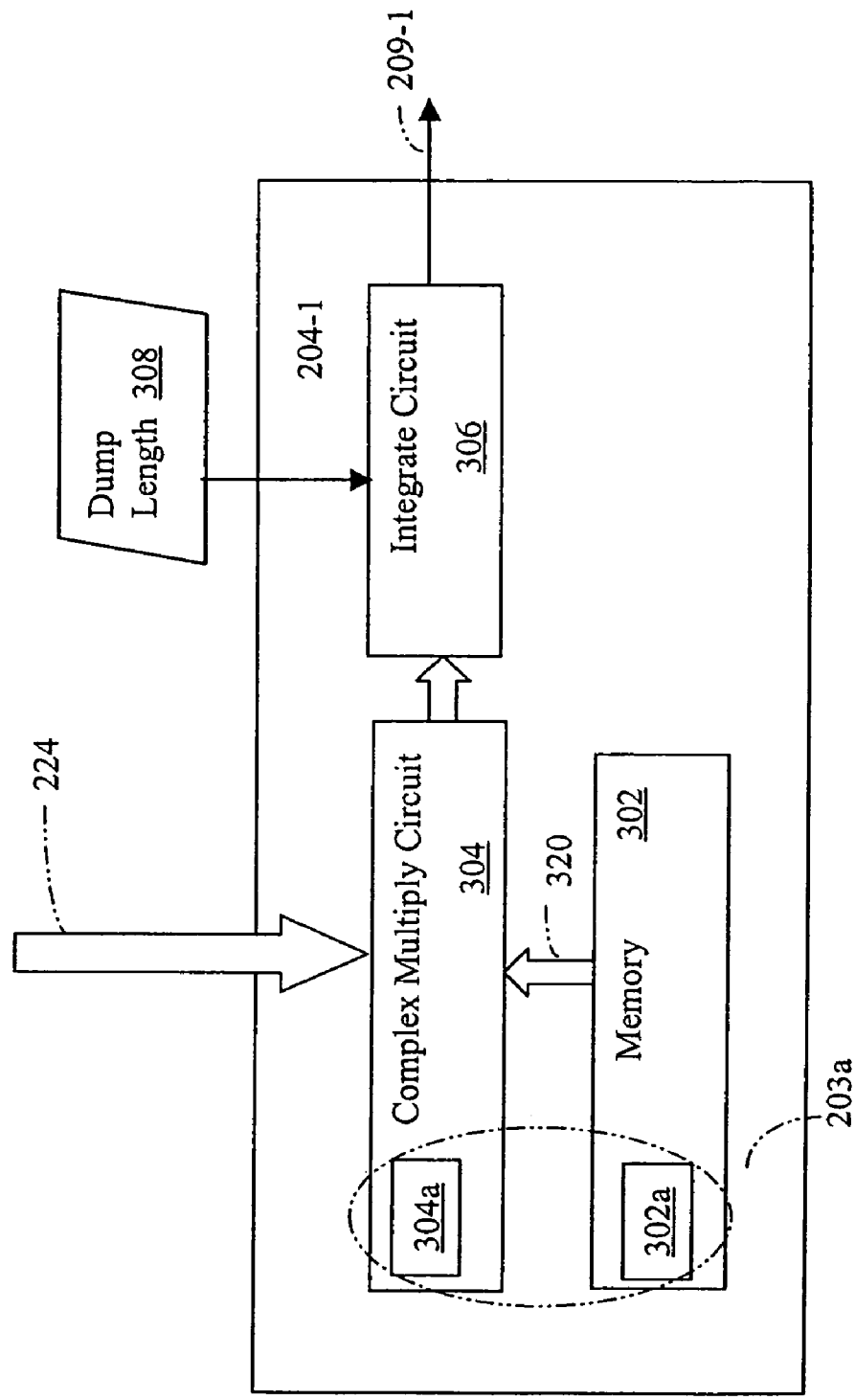
FIG. 3 is a block diagram of a correlate, integrate, and dump portion of a computation circuit, in accordance with one embodiment of the present invention.

Referring now to FIG. 3, a block diagram of a correlate, integrate and dump portion of a computation circuit is shown, in accordance with one embodiment of the present invention. The correlate, integrate and dump portion of the computation circuit is used in exemplary fast searcher devices 120a through 120c, shown respectively in previous FIGS. 2A–2C.

Exemplary computation circuit 204-1 includes a multiply circuit 304 coupled to a memory block 302 and to an integrate circuit 306. Memory 302 is coupled to complex multiply circuit via interconnects 320, e.g., a bus or parallel lines. An input from memory block 216 is provided via bus 224 for FIGS. 2B and 2C, or alternatively via input lines, e.g., 205a through 205d for computing circuit 1 204-1 of FIG. 2A. Multiply block 304 contains multiple multiply-logic devices in the present embodiment for multiplying chips of a first code sequence with chips of a second code sequence then summing them with an adder, as deemed by a given protocol. In one embodiment, the multiply circuit has bit slices that contain a multiply-logic device for parallel correlating operations on a chip-by-chip basis. Thus for example, bit slice 203a from FIG. 2A is represented in FIG. 3 by a bit-wide multiply circuit 304a coupled to a memory 302a via a portion of interconnect 320. In another embodiment, multiply block 304 contains multiple multiply-logic devices for multiplying both an in-phase (I) and quadrature phase (Q) chip of a first code sequence with an appropriate I phase portion and a Q phase chip of a second code sequence. The multiply operation is done on a chip-by-chip basis in parallel, then summed, as appropriate for a given protocol. It is appreciated that the multiply components, or the complex multiply components, and their respective coupling arrangements, as required by the communication protocol, are known to one of ordinary skill in the art.

Integrate circuit 306 includes at least one summer for cumulatively adding a real chip portion of signals multiplied in multiply circuit 304. In the alternative embodiment, integrate circuit 306 includes an additional summer, coupled to a complex portion of multiply circuit 304, for cumulatively adding a complex portion of the correlated signals. If multiply circuit performs its multiply operations for each of the chips in the first signal and the second signal in parallel, then integrate circuit 306 utilizes an address tree in memory to sum the results. Integrate circuit 306 has an output 209-1 that is coupled to threshold detector, e.g., detector 212-1 of FIG. 2A for a real portion of the correlated signals, and detector 212-1b for a complex portion of the correlated signals. Integrate circuit 306 has an input for receiving a variable dump length 308, which is stored in memory for the present embodiment.

While exemplary computation circuit 204-1 of FIG. 3 provides a specific embodiment, the present invention is well suited to alternatives. For example, in one alternative embodiment, integrate circuit 306 has a fixed dump length. In another embodiment of FIG. 3, memory 302 is a first in first out (FIFO) similar to memory 216a of FIG. 2A. Exemplary computation circuit 204-1 of FIG. 3 is applicable to each computation circuit 204-2 through 204-N of FIGS. 2A through 2C.

Figure 4:
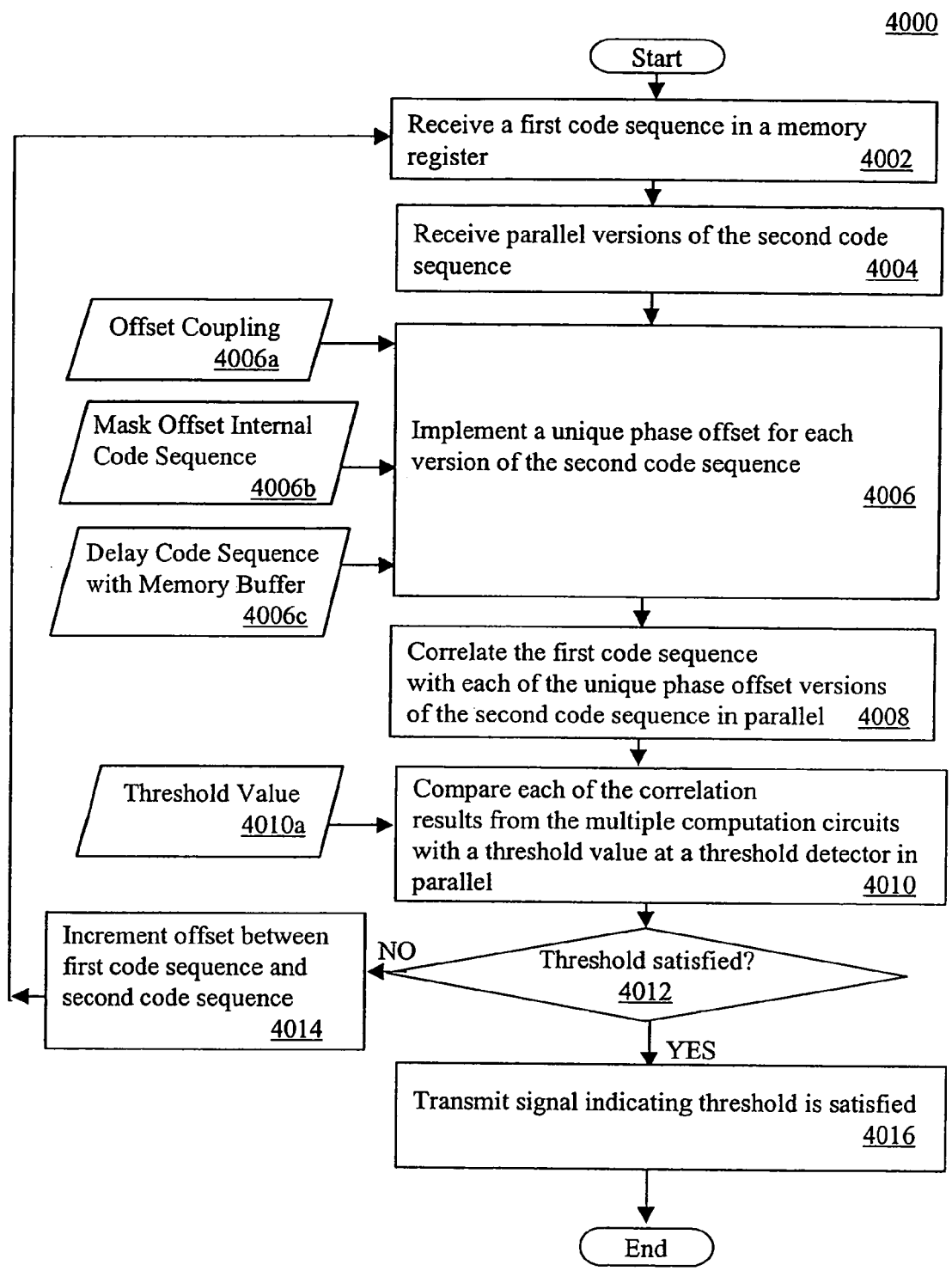
FIG. 4 is a flowchart of the process used to find a phase offset of a received signal, in accordance with one embodiment of the present invention.

Referring now to FIG. 4, a flowchart of the process used to find a phase offset of a received signal is shown, in accordance with one embodiment of the present invention. Flowchart 4000 is implemented, in one embodiment, using the exemplary block diagrams of FIGS. 1, 2A through 2C, and 3. Flowchart 4000 can effectively be used to accommodate a wide range of communication protocols needing to determine the phase of a pilot signal. By using the flowchart embodiment of the present invention, the unknown phase of the pilot channel can be found significantly faster than a single serial search.

Flowchart 4000 begins with step 4002. In step 4002 of the present embodiment, a first code sequence is received. In the present embodiment, the first code sequence is contained within a signal that is received from another device. That is, step 4002 is implemented, in one embodiment, by receiving a signal from a transmitter at antennae 101 of communication device 100a. It is appreciated that the baseband signal having the first code sequence is received at fast searcher 120 in baseband processor 106a, in the present embodiment. Following step 4002, flowchart 4000 proceeds to step 4004.

In step 4004 of the present embodiment, parallel versions of a second code sequence are received. In the present embodiment, the second code sequence is the same sequence of bits as the first code sequence, but with an unknown relative phase offset from the first code sequence. Step 4004 is implemented in one embodiment by providing the second code sequence from a code generator, e.g., code generator 113 of FIG. 1. In one embodiment, the code generator provides a single version of the second code sequence to the searcher, in which circuitry implements a unique offset for the parallel versions, as described in step 4006. In another embodiment, the code generator itself provides the unique phase offset in each of several code sequences respectively provided to one each of the parallel versions of the second code sequence provided to the fast searcher, e.g., searcher 120c of FIG. 2C. Co-pending U.S. patent application Ser. No. 09/751,782, entitled "A CONFIGURABLE CODE GENERATOR SYSTEM FOR SPREAD SPECTRUM APPLICATIONS" by Joel Medlock et al., now U.S. Pat. No. 6,567,017, provides additional detail on the configurable code generator. This related application is commonly assigned, and is hereby incorporated by reference. Alternatively, code sequences can be stored in memory for submission to a searcher.

While the first code sequence in step 4002 is a received signal, and the second code sequence in step 4004 is a code sequence generated locally in a communication device, an alternative embodiment switches these two sources. For example, input data and code sequence can be reversed from the configuration shown in FIGS. 2A and 2B. In this embodiment, the unique phase offsets between the two code sequences are still maintained. The present invention is well suited to any type of code sequences, such as Gold codes, pseudonoise (PN) codes, S2 codes, etc. Following step 4004, flowchart 4000 proceeds to step 4006.

In step 4006 of the present invention, a unique phase offset for each version of the second code sequence is implemented. Step 4006 is implemented in one embodiment by coupling components in fast searcher to realize a physical phase offset, indicated as condition 4006a. For example, the multiple computation circuits of FIG. 2A are physically coupled to different ranges of memories to implement the phase offset. In particular, individual memories 202a through 202c are coupled to computation circuit 204-1, while memories 202d through 202g are coupled to computation circuit 204-N. In an alternative embodiment, step 4006 is implemented by logically delaying a code sequence via different lengths of a memory buffer, as indicated by condition 4006c. For example, memory buffers 226–230 in FIG. 2B, provide a phase offset from each other by using additional memory resources, e.g., buffers 226–230, to delay an input code sequence. Input 4006b for receiving a mask offset internal code sequence is implemented as shown in FIG. 2C by independently communicating the offset code sequence to each respective computing circuit. Following step 4006, flowchart 4000 proceeds to step 4008.

In step 4008 of the present invention, the first code sequence is correlated with each of the unique phase offset versions of the second code sequence in a parallel manner. Step 4008 is implemented in one embodiment by using multiple parallel computing circuits, such as the exemplary circuits shown in FIGS. 2A through 2C. By correlating in parallel, computation time is saved in determining a phase offset for a pilot signal. The sub steps used for the correlation step include multiplication of the first code sequence by the second code sequence, one chip at a time to create a product; integration of the products over a specified period of time to form, and dump, a symbol. If the first code sequence and/or the second code sequence is a complex code sequence, then the integrate and multiply operation involve the following mathematical operations, as are known to those skilled in the art. In particular, an in-phase symbol is obtained by $\Sigma[(I_{Data}*P_N(I))-(Q_{Data}*P_N(Q))]$ and a quadrature phase symbol is obtained by $\Sigma[(I_{Data}*P_N(Q))+(Q_{Data}*P_N(I))]$.

Following step 4008, flowchart 4000 proceeds to step 4010. In step 4010 of the present invention, each of the correlation results is compared with a threshold value. Step 4010 is implemented in one embodiment by communicating the correlation results from each computing circuit, e.g., 204-1 through 204-N, is compared at a respective threshold detector, e.g., 212-1 through 212-N of FIG. 2A, in a parallel manner. Input 4010a provides a threshold value, e.g., from memory storage, to a threshold detector, e.g., 212-1. Alternatively, if the signals correlated are complex, then the in-phase and quadrature phase correlation results are each compared to a threshold at respective threshold detectors, e.g., including duplicate threshold detectors (not shown) for the complex portion of the correlation. By comparing the threshold results in parallel, the results of the correlation step are evaluated much quicker than a serial process. As an alternative to checking each of the correlation results independently at multiple threshold detectors, the correlation results can be summed together and checked at a single threshold detector. If any one of the computation circuits satisfies a composite threshold value, it will be detected, assuming cumulative noise levels from all computation circuits are accounted for. Thereafter, steps can be used to identify which of the correlations provided the strongest signal. Following step 4010, flowchart 4000 proceeds to step 4012.

In step 4012 of the present invention, an inquiry determines whether the threshold is satisfied. If the threshold is satisfied, then flowchart 4000 proceeds to step 4016. However, if the threshold is not satisfied, then flowchart 4000 proceeds to step 4014. In one embodiment, the threshold has to be exceeded, while another embodiment only requires that the threshold be equaled. Step 4012 provides the logic for evaluating the results of the searcher. In the present embodiment, step 4012 is implemented by the threshold circuits 212-1 through 212-N shown in FIGS. 2A through 2C.

Step 4014 arises if the threshold is not satisfied per step 4012. In step 4014 of the present embodiment, the offset between the first code sequence and the second code sequence is incremented. This increment is implemented in one embodiment, by advancing and/or retarding the first code sequence or the second code sequence. For example, a code generator can be advanced by a faster than normal rate to accommodate the increment in offset between the codes. Alternatively, the code generator can be interrupted while the incoming signal continues to advance.

Step 4016 arises if the threshold is satisfied per step 4012. In step 4016 of the present embodiment, a signal is transmitted indicating that the threshold is satisfied. Step 4016 is implemented in one embodiment by energizing an output from the threshold detector, e.g., 212-1, receiving the satisfactory correlation results. The output signal is utilized to provide the phase offset value found by the searcher to other components in the communication device for subsequent process, as is appreciated by those skilled in the art.

Flowchart 4000 can be implemented using offsets of whole chips or of a fraction of a chip. For example, after a successful phase offset is found on a chip granularity basis, flowchart 4000 may be repeated at sub-chip granularity. By using sub-chip granularity, the phase offset between the first sequence and the second sequence can be more precisely determined. Alternatively, flowchart 4000 can be implemented on a searcher having different window lengths, e.g., different effective lengths of correlation circuit 204-1. In general, the longer the length of the correlated sequences, the more reliable the results. Either of these alternatives can be implemented by instructions and data values stored in local memory or in system memory, e.g., memory 104 of FIG. 1. Steps and data values can be executed by a local controller in a searcher, or by system controller 110 in FIG. 1. In one embodiment, chip resolution is reduced to $1/8^{th}$ chip. However, the present invention is well suited to using any chip resolution, as supported by a code generator or local clock rate. Alternatively, the window length can be expanded by considering a longer sequence of the second code sequence and/or of the first code sequence, to be correlated against each other. For example, if the window length is extended, more accurate correlation results can be obtained.

While flowchart 4000 of the present embodiment shows a specific sequence and number of steps, the present invention is suitable to alternative embodiments. For example, not all the steps provided in flowcharts 4000 are required for the present invention. In particular, flowchart 4000 provides steps 4010 for parallel comparisons of correlation results with a threshold value. However, in an alternative embodiment, the parallel comparison step is not needed because it is replaced by a single comparison operation. Furthermore, the present invention is well suited to incorporating additional steps to those presented, as required by an application, or as desired for permutations in the process. Finally, the sequence of the steps for flowchart 4000 can be modified depending upon the application. Thus, while flowchart 4000 is shown as a single serial process, it can also be implemented as a continuous or parallel process. For example, it is appreciated that flowchart 4000 can be repeated for each of multiple fast searchers within a communication device, e.g., device 100a.

Many of the instructions for the steps, and the data input and output from the steps, of flowchart 4000 utilize searcher hardware and/or memory and processor hardware components, e.g. memory 104 and processor 110 of FIG. 1. Memory storage enabling any of the flowchart steps in the present embodiment can either be permanent, such as read only memory (ROM), or temporary memory such as random access memory (RAM). Memory storage can also be any format capable of containing program instructions, such as magnetic devices, e.g., a hard drive, optical device, e.g., CD ROM, or powered device such as RAM. Similarly, the processor used to implement any of the flowchart steps can either be a dedicated controller, an existing system processor, or it can be a dedicated digital signal processor (DSP), as appropriate for the type of step. Alternatively, the steps of the present flowchart may be implemented using some form of a state machine.

Some portions of the detailed description, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, chips, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "implementing," "correlating," "comparing," "transmitting," "integrating, " "dumping," "loading," "storing,""generating," "scaling," or the like, refer to the action and processes of a communication device or a similar electronic computation device, that manipulates and transforms data. The data is represented as physical (electronic) quantities within the communication device's components, and is transformed into other data similarly represented as physical quantities within the communication device's components, or computer system memories or registers, or other such information storage, transmission or display devices.

In view of the embodiments presented herein, the present invention effectively provides a method and apparatus that accurately determines a phase offset of a pilot signal. Furthermore, the present invention overcomes the speed and time limitations of a conventional search for finding the pilot signal phase offset of a received signal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. In a searcher, a method of determining a phase offset of a signal, the method comprising the steps of:
    a) receiving the signal having a first code sequence in a memory;
    b) receiving an additional signal having a second code sequence at a plurality of computation circuits;
    c) implementing a unique phase offset for the second code sequence in each of the plurality of computation circuits by temporarily storing the second code sequence in a memory buffer with varying size to provide the unique phase offset to each of the plurality of computation circuits; and
    d) multi-bit correlating the second code sequence having the unique phase offsets with the first code sequence in each of the respective plurality of computation circuits in a single clock cycle and in parallel.

2. The method of claim 1, wherein the memory buffer simultaneously receives and transmits to the computation circuits the second code sequence.

3. The method of claim 1, wherein the memory for the first code sequence simultaneously receives the signal and transmits multiple signal samples in parallel to each of the plurality of computation circuits.

4. The method of claim 1, wherein each of the plurality of computation circuits begins correlating simultaneously.

5. The method of claim 1, wherein the phase of the second code sequence at each of the plurality of computation circuits is the same.

6. A communication device for processing data signals, the communication device comprising:
    a transceiver for receiving a signal having a first code sequence into a memory;
    a code generator for generating a second code sequence;
    a searcher coupled to the transceiver and to the code generator, the searcher having a plurality of computation circuits for multi-bit correlating in a single clock cycle and in parallel the first code sequence and the second code sequence at a plurality of offsets; and
    at least one memory block coupled to at least one of the plurality of computation circuits, the memory block having a variable length to implement a variable offset between the first code sequence and the second code sequence.

7. The communication device of claim 6, wherein the memory block simultaneously receives and transmits to the computation circuits the second code sequence.

8. The communication device of claim 6, wherein the memory for the first code sequence simultaneously receives the signal and transmits multiple signal samples in parallel to each of the plurality of computation circuits.

9. The communication device of claim 6, wherein each of the plurality of computation circuits begins correlating simultaneously.

10. The communication device of claim 6, wherein the phase of the second code sequence at each of the plurality of computation circuits is the same.

* * * * *